US009430799B2

(12) United States Patent
Sivadasan et al.

(10) Patent No.: US 9,430,799 B2
(45) Date of Patent: Aug. 30, 2016

(54) MIXED BANKING TRANSACTIONS

(71) Applicant: IGATE Global Solutions Ltd., Navi Mumbai (IN)

(72) Inventors: Sanjeev Sivadasan, Navi Mumbai (IN); Radhika Shankar, Navi Mumbai (IN); Venkatesh Babu, Navi Mumbai (IN)

(73) Assignee: IGATE Global Solutions Ltd., Navi Mumbai (IN)

( * ) Notice: Subject to any disclaimer, the term of this patent is extended or adjusted under 35 U.S.C. 154(b) by 0 days.

(21) Appl. No.: 14/618,190

(22) Filed: Feb. 10, 2015

(65) Prior Publication Data
US 2016/0125526 A1 May 5, 2016

(30) Foreign Application Priority Data

Nov. 3, 2014 (IN) .......................... 3470/MUM/2014

(51) Int. Cl.
*G06Q 40/02* (2012.01)
*G06Q 20/40* (2012.01)
*G06Q 10/06* (2012.01)
(Continued)

(52) U.S. Cl.
CPC ............ *G06Q 40/02* (2013.01); *G06Q 20/405* (2013.01); *G06Q 10/06* (2013.01); *G06Q 10/0631* (2013.01); *G06Q 10/06311* (2013.01); *G06Q 20/108* (2013.01); *G06Q 20/1085* (2013.01); *G07F 19/20* (2013.01)

(58) Field of Classification Search
CPC .. G06Q 20/1085; G06Q 30/02; G06Q 10/06; G06Q 30/016; G06Q 20/108; G06Q 10/02; G06Q 10/0631; G06Q 10/06311; G07F 19/20
See application file for complete search history.

(56) References Cited

U.S. PATENT DOCUMENTS 6,064,730 A * 5/2000 Ginsberg ............ H04M 3/5191
379/265.09
7,373,309 B2 * 5/2008 Nishikawa ............ G06Q 10/06
705/7.14
(Continued)

FOREIGN PATENT DOCUMENTS

CN 102479401 6/2014 ............. G07C 11/00

OTHER PUBLICATIONS

The Financial Brand, "Mobile App Provides Wait Times, Helps Branch Users Avoid Queues," http://thefinancialbrand.com/24371/mobile-wait-times-queuing-website-app/ , 2 pages, Jun. 28, 2013.
(Continued)

*Primary Examiner* — Christopher Stanford
(74) *Attorney, Agent, or Firm* — Sunstein Kann Murphy & Timbers LLP

(57) ABSTRACT

A method of fulfilling a transaction between a bank and a customer of the bank makes available a form used in a banking transaction to a customer digital device. The form has a plurality of fields. The method scans, within a physical bank branch, an encoded visual display on the client digital device. The encoded visual display has an encoded version of the form and some but not all of the plurality of fields completed with client data. The method further decodes the encoded visual display using a decoding algorithm to produce the form and completed and uncompleted fields. At least one datum may be added, within the physical bank branch, to at least one uncompleted field of the form, and the banking transaction may be processed based on the form with the at least one client datum within the at least one field of the form.

12 Claims, 20 Drawing Sheets

(51) Int. Cl.
*G06Q 20/10* (2012.01)
*G07F 19/00* (2006.01)

(56) References Cited

U.S. PATENT DOCUMENTS

| | | | | |
|---|---|---|---|---|
| 7,712,657 | B1* | 5/2010 | Block | G06Q 20/1085 235/379 |
| 8,396,485 | B2 | 3/2013 | Grainger et al. | 455/456.1 |
| 8,417,614 | B1 | 4/2013 | Mackrell et al. | 705/36 R |
| 8,570,281 | B2 | 10/2013 | Black | 345/173 |
| 8,831,963 | B2 | 9/2014 | Backer et al. | 705/5 |
| 2003/0036936 | A1* | 2/2003 | Steichen | G06Q 10/0639 705/7.38 |
| 2007/0102508 | A1* | 5/2007 | McIntosh | G06Q 20/1085 235/379 |
| 2009/0281817 | A1* | 11/2009 | Ferrara | G06Q 10/06 705/1.1 |
| 2010/0001059 | A1* | 1/2010 | Meek | G06Q 20/105 235/379 |
| 2010/0036690 | A1* | 2/2010 | Chafle | G06Q 10/04 705/7.17 |
| 2012/0143755 | A1* | 6/2012 | Burrell | G06Q 20/10 705/43 |
| 2012/0226524 | A1* | 9/2012 | Corbett | G06Q 10/0631 705/7.36 |
| 2013/0006692 | A1 | 1/2013 | Hans et al. | 705/7.22 |
| 2013/0030925 | A1 | 1/2013 | Calman et al. | 705/14.66 |
| 2014/0095296 | A1 | 4/2014 | Angell et al. | 705/14.45 |
| 2014/0108307 | A1 | 4/2014 | Raghunathan et al. | 706/12 |
| 2014/0258061 | A1* | 9/2014 | Calman | G06Q 40/00 705/35 |
| 2014/0350976 | A1* | 11/2014 | Salas Fehlandt | G06Q 10/02 705/5 |
| 2015/0012580 | A1* | 1/2015 | Lee | G06Q 30/0241 709/201 |
| 2015/0324772 | A1* | 11/2015 | Sarris | G06Q 30/016 705/42 |

OTHER PUBLICATIONS

China Merchants Bank, "Android mobile banking," http://english.cmbchina.com/Personal/Electronic/Default.aspx?guid=26db1e6e-6c35-4892-b26b-370d6c5650ab, 3 pages, dated Nov. 19, 2014.

* cited by examiner

MIXED BANKING TRANSACTIONS

PRIORITY

This patent application claims priority from Indian Patent Application Number 3470/MUM/2014, filed Nov. 3, 2014, entitled, "MIXED BANKING TRANSACTIONS," and naming IGate Global Solutions Ltd. as Applicant, as the applicant, the disclosure of which is incorporated herein, in its entirety, by reference.

TECHNICAL FIELD

The present invention relates to completing a banking transaction using multiple locations, and more particularly to systems for performing reservation management across multiple banking branches for a banking customer having a mobile device.

BACKGROUND ART

Banks offer many products and services, such as check cashing, loans for houses, cars, and personal use, investments such as certificates of deposit, and wealth management, among many others. Typically, obtaining these products and services is a time consuming and involved task. For example, applying for a home mortgage loan may require a customer to execute dozens of forms and be present at the bank branch for several hours. It may be inconvenient for a busy customer to block off a single, long period of time to devote to executing these forms at a single bank location. Also, such appointments may require the customer to bring to a bank branch many documents containing personal financial information, such as a credit report, asset statements, tax returns from prior years, and others that are inconvenient and potentially risky to carry in public.

SUMMARY OF ILLUSTRATIVE EMBODIMENTS

Illustrated embodiments of the invention permit bank customers to perform a banking transaction from multiple physical locations, one of which is a given bank branch. A bank has a bank server and a bank branch has a bank client computer. A customer has a mobile electronic device. A banking form is fully or partially completed on a customer computer, and transferred to the mobile device if necessary, prior to the customer entering the given bank branch. The customer enters the given bank branch and instructs the mobile device to generate and display an image, such as a two-dimensional barcode, based on the form and the entered data. The image is visually scanned by the bank client computer, the form is completed if necessary, and the completed form is transmitted to the bank server for fulfillment.

A first embodiment of the invention is a system for fulfilling a transaction between a bank and a customer of the bank. The system includes a plurality of bank client computers, wherein each bank client computer is physically located within a different bank branch and a bank server. Each bank client computer is configured to receive transaction data, at least a portion of which is received by scanning a visual display of a customer mobile device when the customer mobile device is physically present at the bank branch, and transmit the received data to the bank server for fulfillment of the transaction.

The bank server is configured to store, in a memory, data indicating wait times at each branch of the bank. It is also configured to transmit, to a digital device based on the location of the digital device and a transaction type received from the digital device when the digital device is not physically present at a bank branch, (a) a collection of bank branches in physical proximity to the digital device that are capable of servicing the transaction, and (b) a wait time for each branch in the collection. The bank server is also configured, in response to receiving, from the digital device, a selection of a given bank branch, to transmit, to the bank client computer physically located within the given bank branch, data indicating the type of transaction. It is also configured, in response to receiving, from the bank client computer, data indicating that the customer has arrived at the given bank branch, to alter the data stored in the memory to increase the wait time for the given bank branch as a function of the type of the transaction. Finally, the bank server is configured, in response to receiving the visually scanned transaction data from the bank client computer, to (a) fulfill the transaction on behalf of the bank and (b) alter the data stored in the memory to decrease the wait time for the given bank branch.

Various modifications of the system are contemplated. The transaction may be one of: opening or closing a bank account, cashing a check, activating or deactivating a banking service, applying for a loan, applying for a line of credit, depositing valuables for safekeeping, investing in an interest-bearing asset, or managing wealth. The bank server may be a single computing device or a plurality of computing devices. The customer mobile device may be a telephone, a laptop computer, a tablet computer, or a personal digital assistant. The digital device may be a telephone, a laptop computer, a tablet computer, a personal digital assistant, a desktop computer, or a kiosk computer. The bank server may be further configured to transmit queuing data to the customer mobile device via the Short Message Service (SMS) or Instant Messaging (IM). The bank server may be further configured to produce, and electronically transmit to the customer mobile device, an interactive game for reaching a goal related to the customer's personal finances. If so, the bank server may be further configured to select a banking product or service that, if purchased by the customer, will help the customer achieve the goal related to the customer's personal finances; and electronically transmit to the customer mobile device, for display in the context of the interactive game, an advertisement for the selected banking product or service.

In another embodiment there is provided a method of fulfilling a transaction between a bank and a customer of the bank. The method includes storing data in a memory, the data indicating wait times at each of a plurality of branches of the bank. The method also includes transmitting, to a digital device based on the location of the digital device and a transaction type received from the digital device when the digital device is not physically present at a bank branch, (a) a collection of bank branches in physical proximity to the digital device that are capable of servicing the transaction, and (b) a wait time for each branch in the collection. The method further includes, in response to receiving, from the digital device, a selection of a given bank branch, transmitting, to the bank client computer physically located within the given bank branch, data indicating the type of transaction. Next, the method includes, in response to receiving, from the bank client computer, data indicating that the customer has arrived at the given bank branch, altering the data stored in the memory to increase the wait time for the given bank branch as a function of the type of the transaction. Finally, the method requires, in response to receiving, from the bank client computer, transaction data of which at least a portion was received in the bank client computer by scanning a visual display of a customer mobile device, (a) fulfilling the transaction on behalf of the bank and (b) altering the data stored in the memory to decrease the wait time for the given bank branch.

Various modifications of the method are contemplated. The transaction may be one of: opening or closing a bank account, cashing a check, activating or deactivating a banking service, applying for a loan, applying for a line of credit, depositing valuables for safekeeping, investing in an interest-bearing asset, or managing wealth. The customer mobile device may be a telephone, a laptop computer, a tablet computer, or a personal digital assistant. The digital device may be a telephone, a laptop computer, a tablet computer, a personal digital assistant, a desktop computer, or a kiosk computer. Transmitting to the mobile device comprises transmitting via the Short Message Service (SMS) or Instant Messaging (IM). The scanned portion of the transaction data may be entered into the customer mobile device when the customer is not physically within the given bank branch. The visual display may include an image of a two dimensional barcode that encodes the transaction data.

In a related embodiment, the method includes producing, and electronically transmitting to the customer mobile device, an interactive game for reaching a goal related to the customer's personal finances. If so, the method may further include selecting a banking product or service that, if purchased by the customer, will help the customer achieve the goal related to the customer's personal finances; and electronically transmitting to the customer mobile device, for display in the context of the interactive game, an advertisement for the selected banking product or service.

Another embodiment of the invention is a mobile electronic device. The device has a location sensor. The device also has a network interface for transmitting a location produced by the location sensor and a transaction type to a bank server, for receiving responsive data from the bank server indicating (a) a collection of bank branches in physical proximity to the mobile electronic device that are capable of servicing the transaction and (b) respective wait times for each branch in the collection, and for transmitting to the bank server a selection of a branch in the collection. The device further has a memory for storing an image, a form used in a banking transaction having the transaction type, and data values entered into the form. The device also has a computing processor for generating the image based on the form and the entered data. The device further includes a display for showing (a) the form, (b) the image, and (c) the responsive data. Finally, the device also has an input configured to receive data into the form, to select a bank branch from the collection, to instruct the computing processor to create the image, and to instruct the display to show the image.

The device may be a telephone, a laptop computer, a tablet computer, or a personal digital assistant. The location sensor may include a global positioning system (GPS) client. The network interface may be configured to transmit and receive data via the Short Message Service (SMS) or Instant Messaging (IM). The image may include a two dimensional barcode that encodes the data values entered into the form. The display may be configured to show the responsive data as an overlay on a map. The display also may be configured to show the responsive data using different colors to represent respective ranges of wait times. The memory, processor, and display may be further configured to produce an interactive game for reaching a goal related to the personal finances of an individual.

In accordance with other embodiments of the invention, a method of fulfilling a transaction between a bank and a customer of the bank makes available a form used in a banking transaction to a customer digital device. The form has a plurality of fields. The method scans, within a physical bank branch, an encoded visual display on the client digital device. The encoded visual display has an encoded version of the form and some but not all of the plurality of fields completed with client data. The method further decodes the encoded visual display using a decoding algorithm to produce the form and completed and uncompleted fields. At least one datum may be added, within the physical bank branch, to at least one uncompleted field of the form, and the banking transaction may be processed based on the form with the at least one client datum within the at least one field of the form.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Illustrated embodiments of the invention permit bank customers to perform a banking transaction from multiple physical locations, one of which is a given bank branch. A bank has a bank server and a bank branch has a bank client computer. A customer has a mobile electronic device. A banking form is fully or partially completed on a customer computer, and transferred to the mobile device if necessary, prior to the customer entering the given bank branch. The customer enters the given bank branch and instructs the mobile device to generate and display an image, such as a two-dimensional barcode, based on the form and the entered data. The image is visually scanned by the bank client computer, the form is completed if necessary, and the completed form is transmitted to the bank server for fulfillment.

Definitions. As used in this description and the accompanying claims, the following terms shall have the meanings indicated:

A "banking transaction" is a transaction between a bank and a customer of the bank for a specified product or service offered by the bank. Such products and services include, for example, opening or closing a bank account, cashing a check, activating or deactivating a banking service, applying for a loan, applying for a line of credit, depositing valuables for safekeeping, investing in an interest-bearing asset, and managing wealth.

A "mixed banking transaction" is a banking transaction that requires a customer of the bank to perform multiple steps, where at least two of the steps occur in different physical locations, and at least one of the physical locations is a physical bank branch.

A "server" is any electronic computing device or collection of multiple electronic computing devices that performs one or more predefined services in response to requests for such services made electronically by other electronic computing devices.

A "mobile device" is a portable electronic device that has the ability to transmit its location to other electronic devices. A customer mobile device may be, for example, a mobile telephone (such as a cellular phone and/or a smartphone), a laptop computer, a tablet computer, or a personal digital assistant.

"physical proximity" to a device means a geographic area, having a given size and shape, that includes the device. The given size and shape may be defined, for example, as a function of a city, state, or postal code in which the device is located.

A "bank branch" is a physical building or other structure (e.g., a kiosk or automatic teller machine) through which a bank at least partially runs its business.

Figure 1:
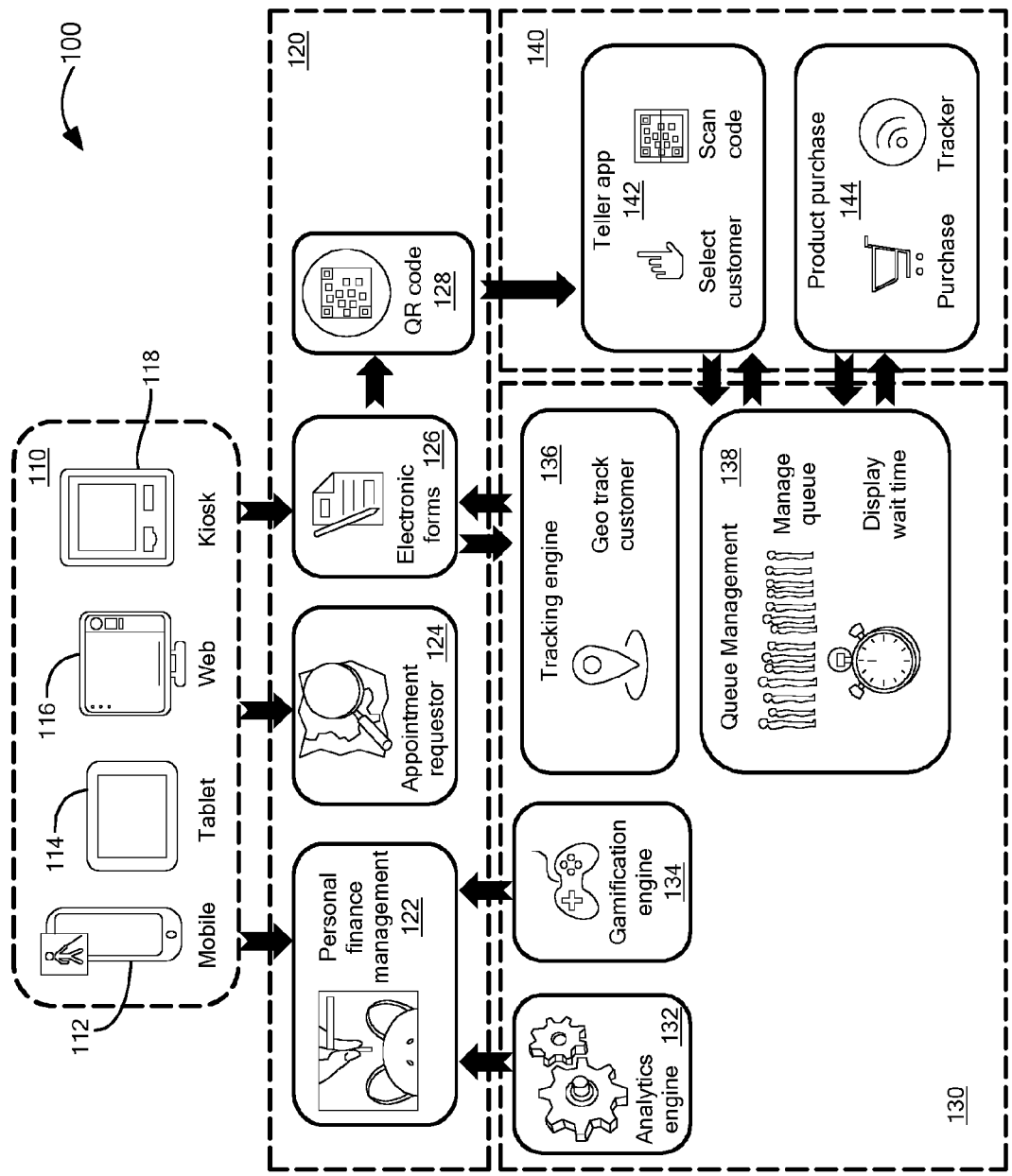
FIG. 1 is a schematic representation of hardware and software components used in accordance with a system embodiment of the invention.

FIG. 1 is a schematic representation of hardware and software components used in accordance with a system embodiment of the invention (generally identified by reference number "100"). Broadly speaking, the embodiment may be described in terms of four components:

a. digital devices 110 that provide data input into the system from customers;
b. functions 120 that the customers, with their digital devices, use to interact with the bank;
c. a bank server 130 that interfaces with the functions 120 to provide banking services; and
d. a number of banking client computers 140 that also interface with the functions 120 and with the bank server 130 to complete banking transactions.

The arrows in FIG. 1 show communication directionality. For example, the arrows may represent bidirectional data flow, such as between client-side and server-side components. Continuing with the noted example, data can be retrieved by the point-of-access from a central repository, and data can also be sent back. For example, one may receive promotional messages from financial services providers or retailers. Some embodiments enable interaction with such entities by sending feedback on the same channel in the same way.

Figure 2:
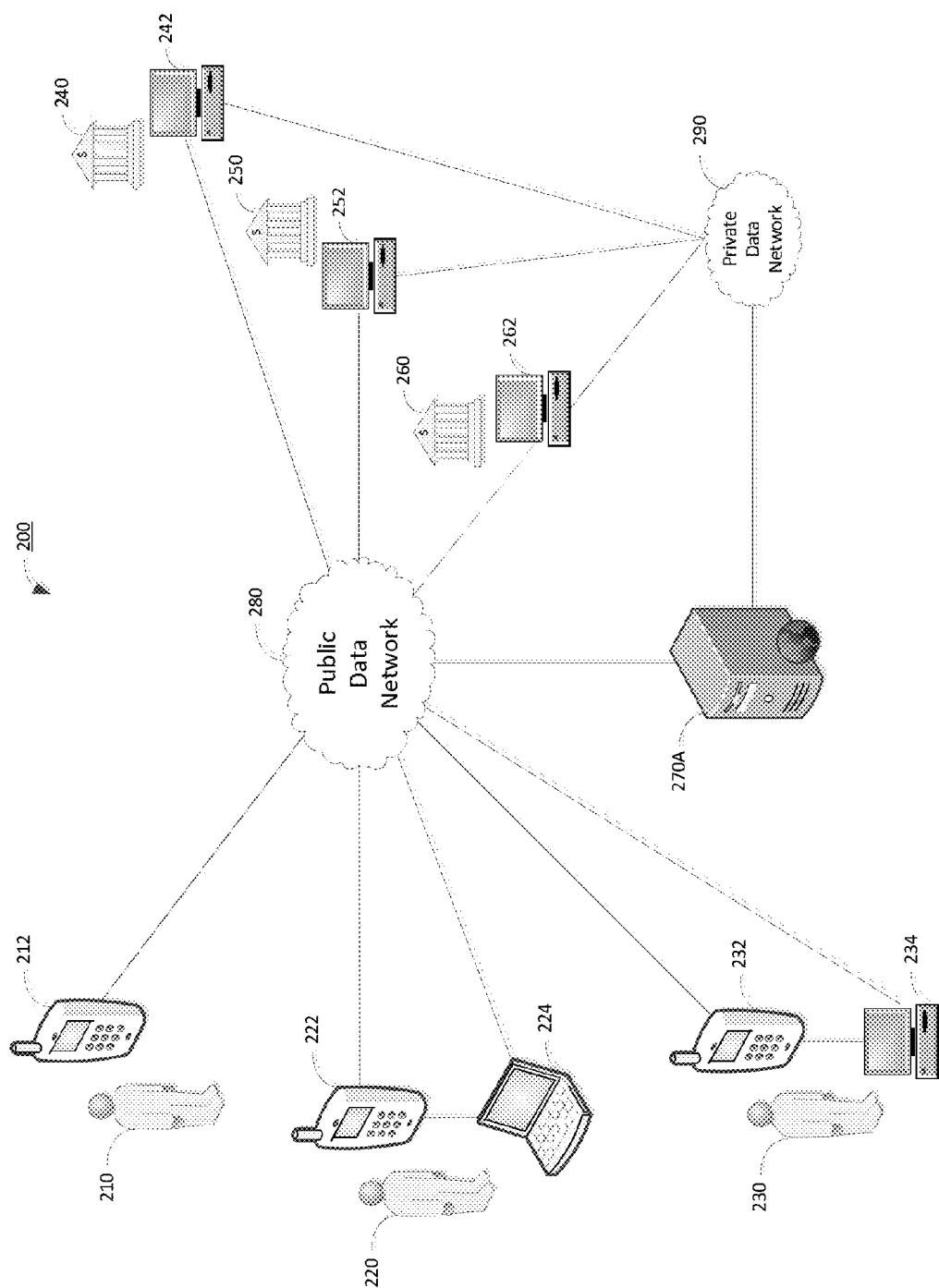
FIG. 2 is a schematic representation of an environment in which an embodiment of the invention may be used.
Figure 3:
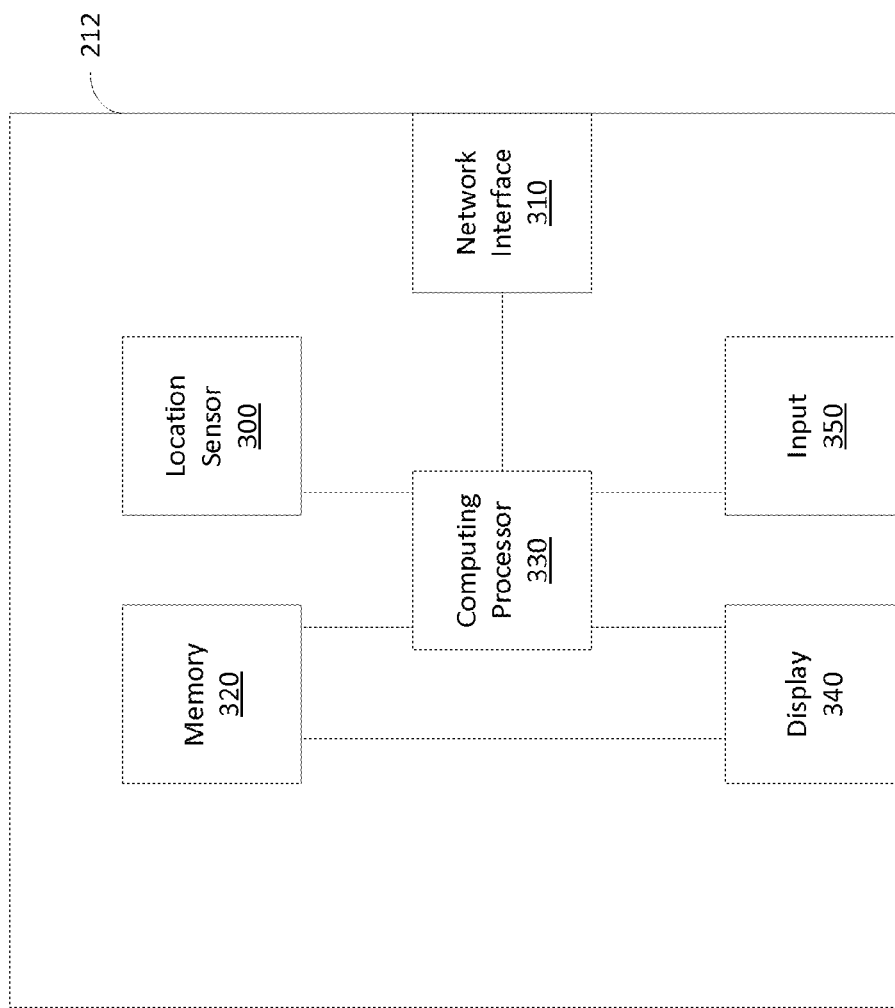
FIG. 3 is a schematic representation of a mobile electronic device used in accordance with an embodiment.

Digital devices 110 include any electronic devices that are capable of executing one or more of the functions 120. Thus, a digital device may be a customer mobile electronic device, such as a customer smartphone 112, a tablet computer 114, or a laptop computer or personal digital assistant (not shown for brevity). Or, a digital device may be a desktop computer 116 with a web browser at a customer's home, or a kiosk 118 in a public place such as a mall, public transportation station, or other establishment. FIG. 2 is a schematic representation of an environment in which these digital devices 110 may be used, while FIG. 3 is a schematic representation of an individual mobile electronic device.

Various banking functions 120 are performed by the digital devices 110. These functions 120 permit a customer to complete a mixed banking transaction, as shown in the flowcharts of FIGS. 4-7. In a preferred embodiment, all of the functions 120 may be performed on all of the devices 110, thereby providing channel convergence. There are four functions shown in FIG. 1; it will be appreciated that other embodiments of the invention may include more or fewer functions. The shown functions are: personal finance management 122, appointment requesting 124, electronic form execution 126, and barcode generation 128. Personal finance management 122 is described below in connection with FIGS. 16-20; the remainder of the functions and the components they involve are now described in more detail.

Figure 8:
FIG. 8 shows an example screen in a customer mobile device for displaying queuing data pertaining to bank branches in a vicinity of the device.

A banking customer may use the appointment requesting function 124 to request an appointment at a bank branch to complete a banking transaction. The appointment requesting function 124 communicates with a bank server 130, and in particular with a geotracking engine 136 and a queue management engine 138 as described in more detail below, to provide a list of nearby bank branches that are capable of servicing the type of requested transaction and wait times at the various bank branches. The customer may then request an appointment at a particular branch, and the bank server 130 communicates this information to a bank client computer 140 at the branch. If the customer requests the appointment using a smartphone 112 with location tracking abilities, the geotracking engine 136 advantageously can provide a dynamically updating list of branches as the customer moves about. Also, the queue management engine 138 advantageously provides real-time updates to the length a customer should expect at each branch. FIG. 8 shows an example screen in a customer mobile device for displaying queuing data pertaining to tellers at a bank branch in a vicinity of the device.

Figure 9:
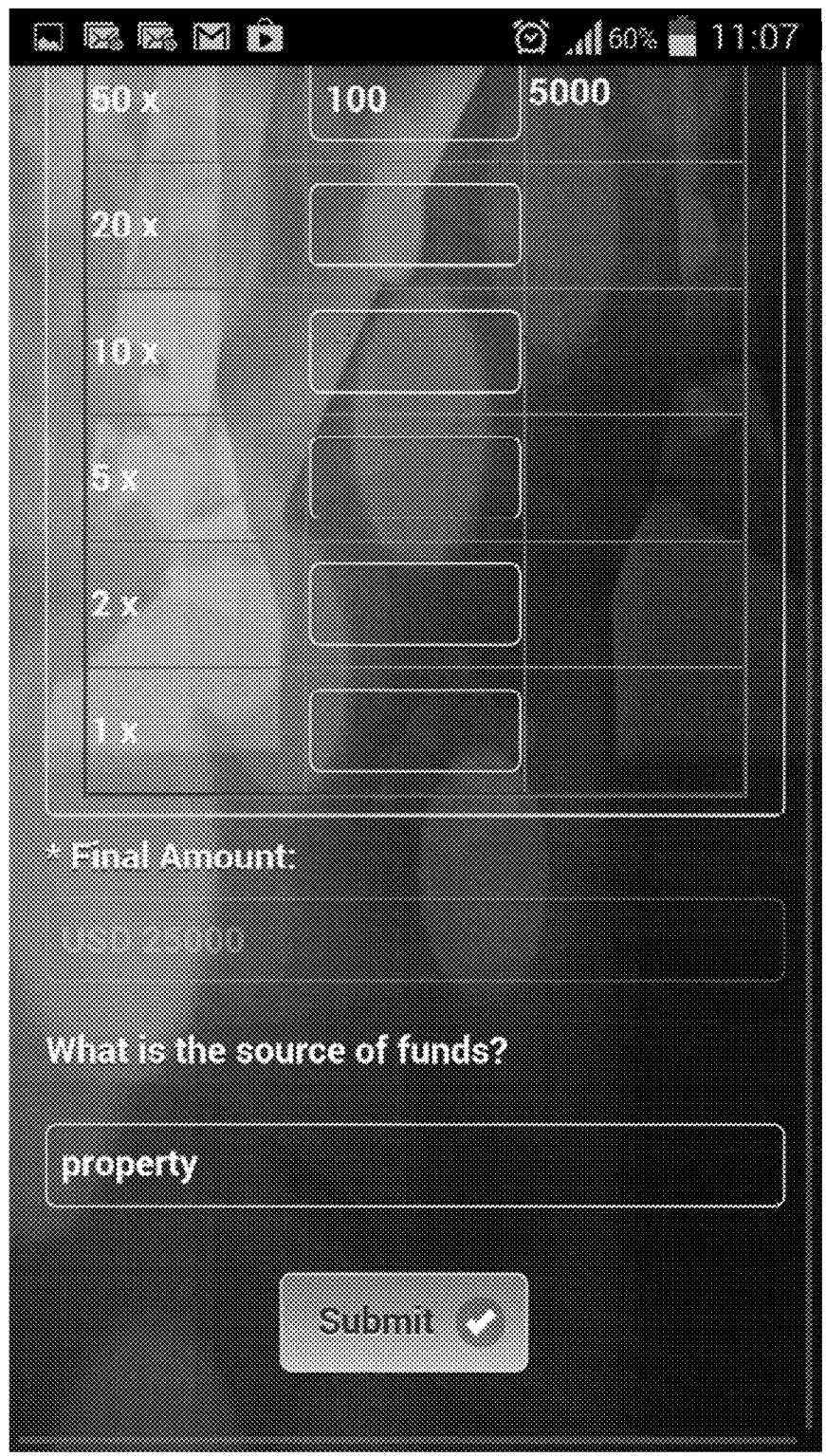
FIG. 9 shows an example screen in a customer mobile device for filling out a bank form in furtherance of a mixed banking transaction.

In accordance with a preferred embodiment of the invention, the customer may actually engage in a mixed banking transaction by executing a bank form using the electronic form execution function 126 in advance of making an appointment. The customer may use any of the digital devices 110 to obtain the form from a convenient location, such as a bank website or a banking application installed in the device. The customer may execute the form, in full or in part, when the customer is somewhere other than inside a physical bank branch. This feature advantageously affords the customer the convenience of executing bank forms at a time and place of the customer's choosing, rather than at a lengthy appointment in a bank branch. This feature also advantageously permits a customer to leave blank any portions of the form about which she is unsure, leaving that portion to be completed in the presence of a bank agent who can assist her. FIG. 9 shows an example screen in a customer mobile device for filling out a bank form in furtherance of a mixed banking transaction.

Figure 10:
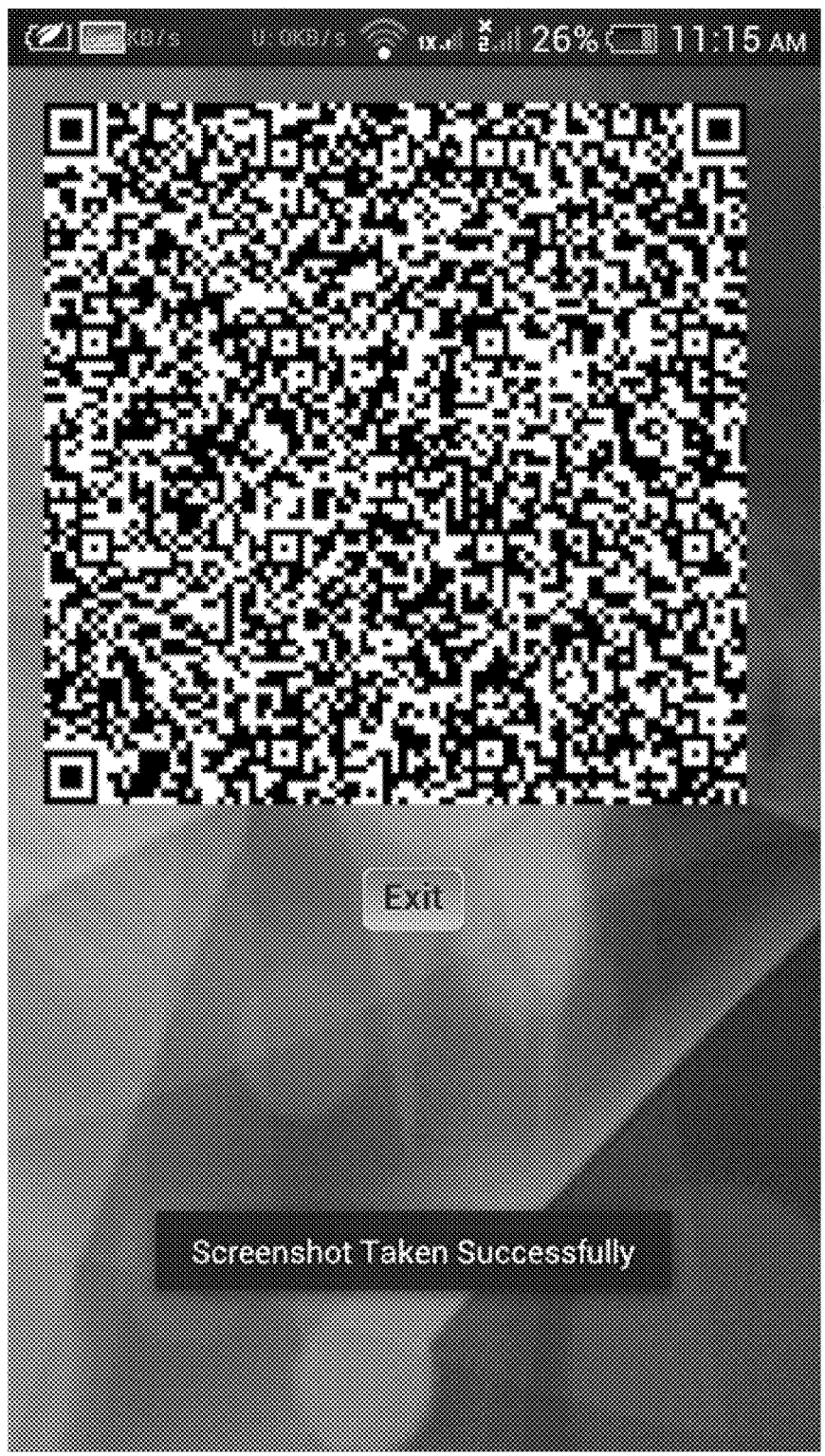
FIG. 10 shows an example screen in a customer mobile device for displaying form data as an image that may be read by a bank client computer at a bank branch.

To further the mixed banking transaction, the customer uses the barcode generation function 128 on an appropriate digital device. This function 128 may be conventional, generating a two dimensional barcode such as a barcode (or other visual indicia capable of being encoded) that can be displayed on the customer's mobile device 112 or 114. The barcode encodes the data entered into the form, and in some embodiments, other information about the form (such as the type of transaction the form is used with). Once the barcode has been generated, it is transferred to the customer's mobile device (if it was not already generated there). FIG. 10 shows an example screen in a customer mobile device for displaying form data as an image that may be read by a bank client computer at a bank branch.

Figure 11:
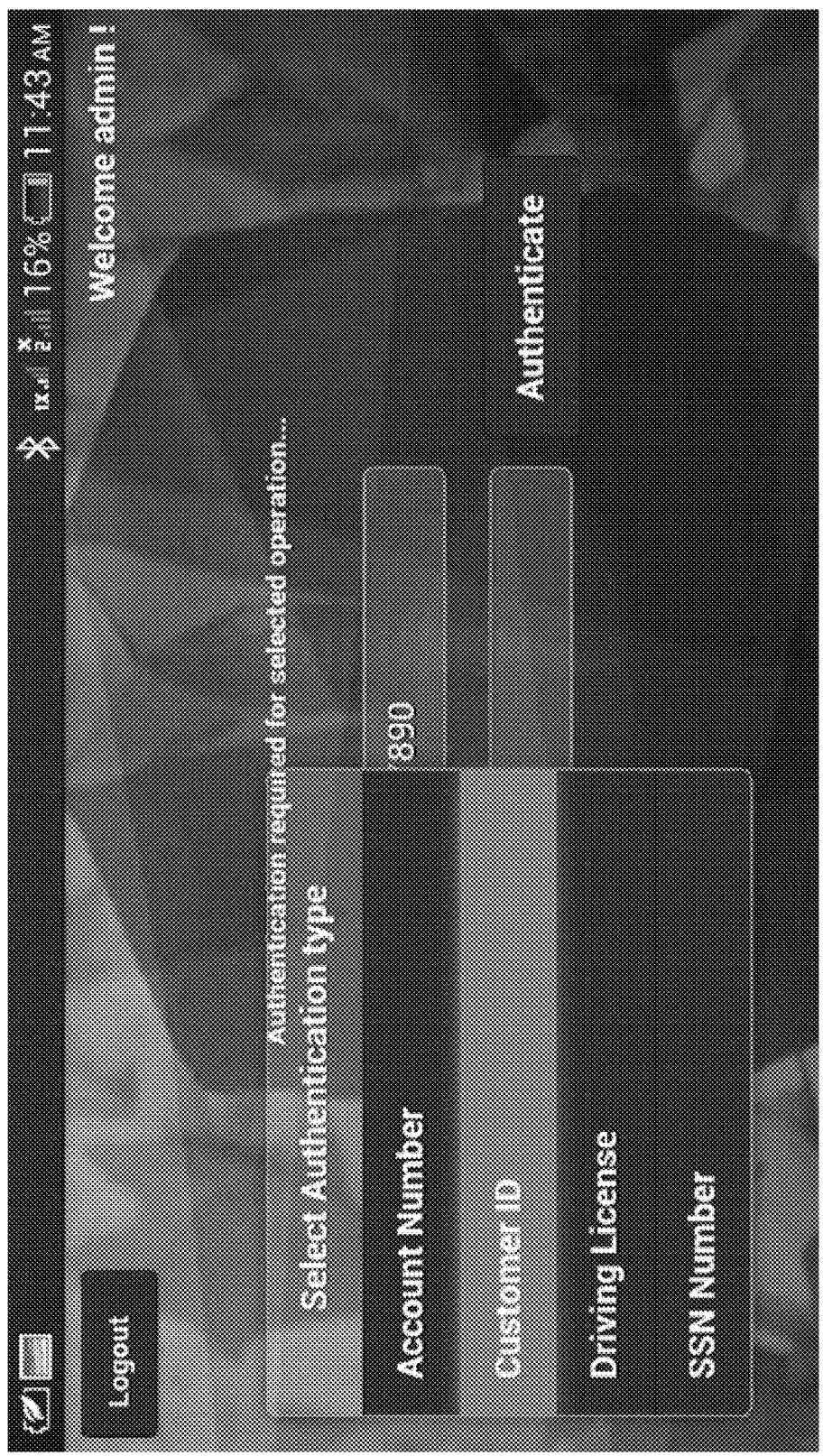
FIG. 11 shows an example screen in a bank client computer for choosing a method by which to authenticate a customer in furtherance of a mixed banking transaction.
Figure 12:
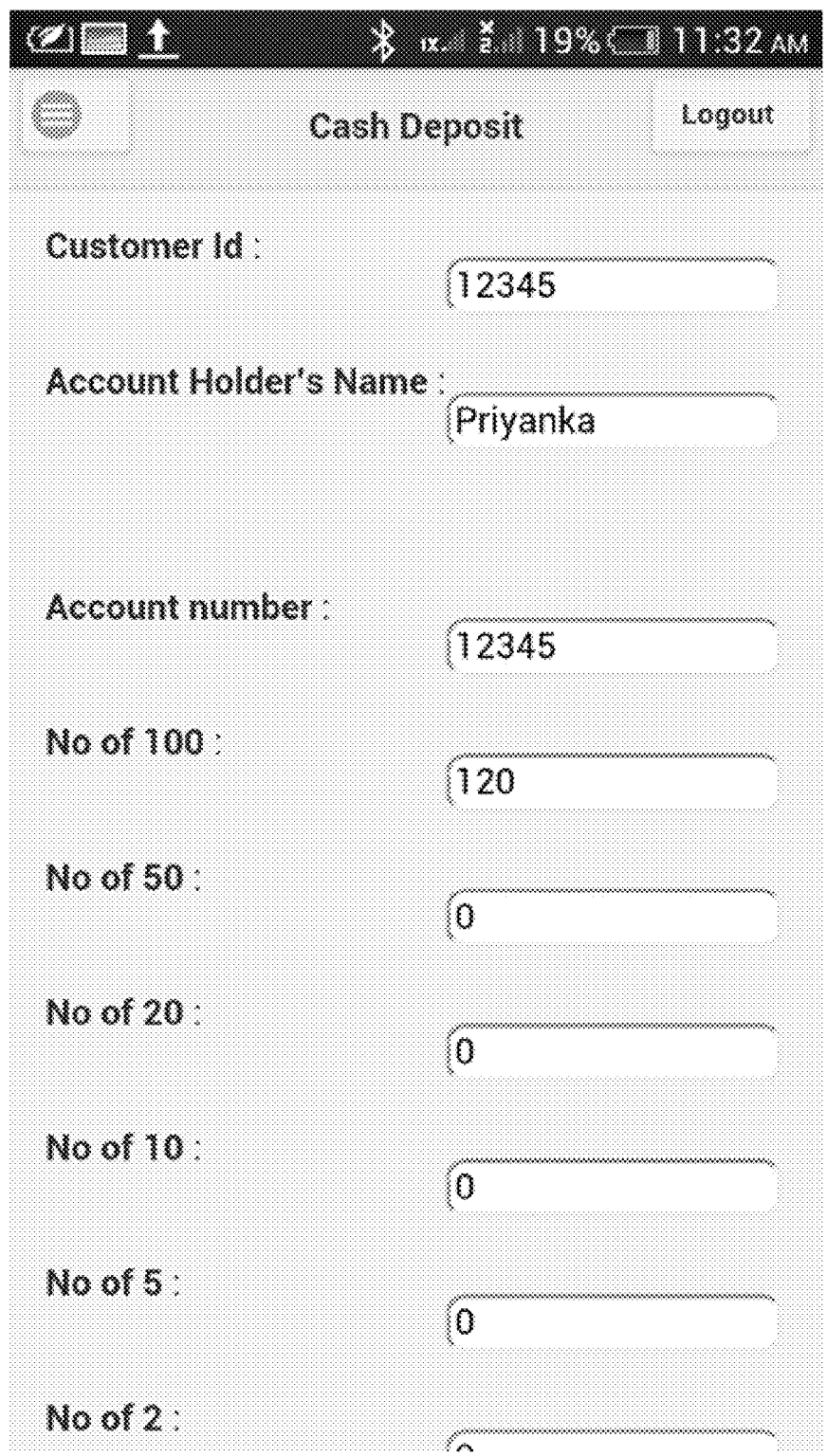
FIG. 12 shows an example screen in a bank client computer containing a portion of the form of FIG. 9, having data pre-populated by scanning the image of FIG. 10.
Figure 13:
FIG. 13 shows a portion of the form of FIG. 12 that includes a digital signature.

To complete the mixed banking transaction, the customer arrives at a bank branch for her scheduled appointment and instructs her mobile device to display the barcode. A bank agent authenticates the customer to load her data. FIG. 11 shows an example screen in a bank client computer for choosing a method by which to authenticate a customer in furtherance of a mixed banking transaction. Next, the bank agent uses an image scanner, which may be conventional, to scan the image of the barcode on the screen of the mobile device into a bank client computer 140. The scanned data are then displayed on the bank client computer 140 as a form. FIG. 12 shows an example screen in a bank client computer containing a portion of the form of FIG. 9, having data pre-populated by scanning the image of FIG. 10, and FIG. 13 shows a portion of the same form that includes a digital signature. The form of FIG. 12 therefore has a number of fields that have data (e.g., "Customer ID" field), and a number of other fields that are not completed (e.g., the "No of 10:" field). The bank agent works with the customer to complete the form, then the bank client computer 140 communicates the completed form data to the bank server 130, which fulfills the transaction on behalf of the bank. The bank agent uses a teller app 142 and a product purchase interface 144 in the bank client computer 140 to facilitate this process.

It will be understood that a banking transaction may require any number of electronic forms. Therefore, in accordance with an embodiment of the invention, the customer may enter data into at least one of the forms before entering a bank branch. Also, it will be appreciated that a banking transaction could be performed "in reverse"; that is, by conducting the appointment at a bank branch first, then completing the form data at home, at work, or at another convenient location (including a different bank branch). Therefore, in accordance with another embodiment of the invention, the customer may partially execute a form at one bank branch, and then complete the form elsewhere, thereby performing a mixed banking transaction in reverse.

As noted above, FIG. 2 is a schematic representation of an environment in which an embodiment of the invention may be used. Data communication channels are indicated by lines between different elements. It should be appreciated that these data communication channels may be secured, as described below in more detail. The environment 200 includes a multitude of individuals 210, 220, 230. These individuals are customers of a bank having branches 240, 250, 260. The bank has a bank server 270A that may be located at a data warehousing site.

The customers 210, 220, 230 each possess respective customer mobile electronic devices 212, 222, 232. Customer 220 also has a laptop computer 224 that communicates electronically with her mobile device 222, while customer 230 has a desktop computer 234 that communicates electronically with his mobile device 232. The customer mobile devices communicate visually and electronically with bank client computers 242, 252, 262 that are physically located at the respective bank branches 240, 250, 260. The customer mobile devices 212, 222, 232 and the customer computers 224, 234 communicate electronically and securely with the bank server 270A using a public data network 280, such as the Internet, or other network. The bank client computers communicate electronically and securely with the bank server preferably using a private data network 290, but they may communicate using the public data network 280 if security measures such as encryption are used. Electronic communication between the devices may use any wireless or wired medium, although in a preferred embodiment, the bank server 270 transmits data to the customer mobile devices 212, 222, 232 via either the Short Message Service (SMS) or Instant Messaging (IM) using a cellular network.

It should be understood that, while only three customers and only three bank branches are shown, a given bank may have any number of customers and any number of branches. Also, it should be understood that, while a single bank server 246 is shown, this server may be implemented by any number of cooperating computing devices.

FIG. 3 is a schematic representation of a mobile electronic device, such as device 212, used in accordance with an embodiment of the invention. FIG. 3 shows a typical arrangement of these components within the mobile electronic device 212, and one example of the data connections between them. It should be appreciated that only those components required to implement an embodiment of the invention are shown; a commercial device may include other components. The different components may be implemented using conventional hardware, software, firmware, and/or other widely used components. For example, the components may be formed from integrated circuits (e.g., application specific integrated circuits or microprocessors), analog circuitry, and/or gate arrays. Also, a commercial device may arrange the data connections between components differently.

Among other things, the mobile electronic device 212 may be a telephone (e.g., a smartphone), a laptop computer, a tablet computer, a personal digital assistant, or any similar portable device. Some embodiments envision an automobile with build-in functionality to effectively form a mobile electronic device 212. A typical mobile electronic device 212 includes a location sensor 300, such as a global positioning system (GPS) client, for repeatedly and accurately producing location data. Some embodiments also may have inertial sensors (e.g., accelerometers and gyroscopes) to further assist with location services.

The mobile electronic device 212 also includes a network interface 310, such as a WIFI transceiver, for electronically transmitting to and receiving data from the bank server 270, and for other purposes known in the art. Transmitted data may include data produced by the location sensor, and a type of banking transaction, while received data may include a collection of bank branches in physical proximity to the device that are capable of servicing the transaction, and respective wait times; these data are described in more detail below. The network interface 310 may transmit and receive data via the Short Message Service (SMS) or Instant Messaging (IM). In a preferred embodiment, transaction data are transmitted between the device 212 and the bank server 270 using a secure data communications channel within the public data network 280. For example, security may be provided on an otherwise unsecure communications channel by employing a data encryption protocol mutually agreed to by the device 212 and the bank server 270. Such encryption protocols are well known in the art, as are methods for negotiating their selection and configuration by two computing systems (e.g. a device 212 and a bank server 270) that are otherwise unknown to each other.

The mobile electronic device 212 also includes a memory 320 that may be any conventional volatile memory, non-volatile memory, or combination thereof. The memory is configured to store various data described in more detail below, including an image, a form used in a banking transaction, and data values entered into the form. In particular, the image may be a two dimensional barcode, such as a QR Code, that encodes the data values and/or the form itself. The device 212 also includes a computing processor 330 for generating the image based on the form and the entered data. The computer processor 330 may be a conventional CPU or similar device.

The mobile electronic device 212 also has a display 340 for showing the form, the image, and the data received from the bank server 270. The display also may show the received bank branches and/or wait times as an overlay on a map. The wait times may be divided into convenient ranges, such as 0-5 minutes, 5-10 minutes, 10-15 minutes, and more than 15 minutes, and shown on the display using different colors to represent the different ranges. The display 340 may be conventionally constructed.

Finally, the mobile electronic device 212 also has an input 350 configured to receive data into the form from the customer. The input 350 also is used to select a bank branch from among the collection bank branches received by the network interface 310. Moreover, the input 350 also is used to instruct the computing processor 330 to create the image, and to instruct the display 340 to show the image.

In accordance with one embodiment of the invention, the memory, processor, and display are further configured to produce an interactive game for reaching a goal related to the personal finances of an individual, such as the bank customer. One such game is described below in connection with FIGS. 16-20.

Figure 4:
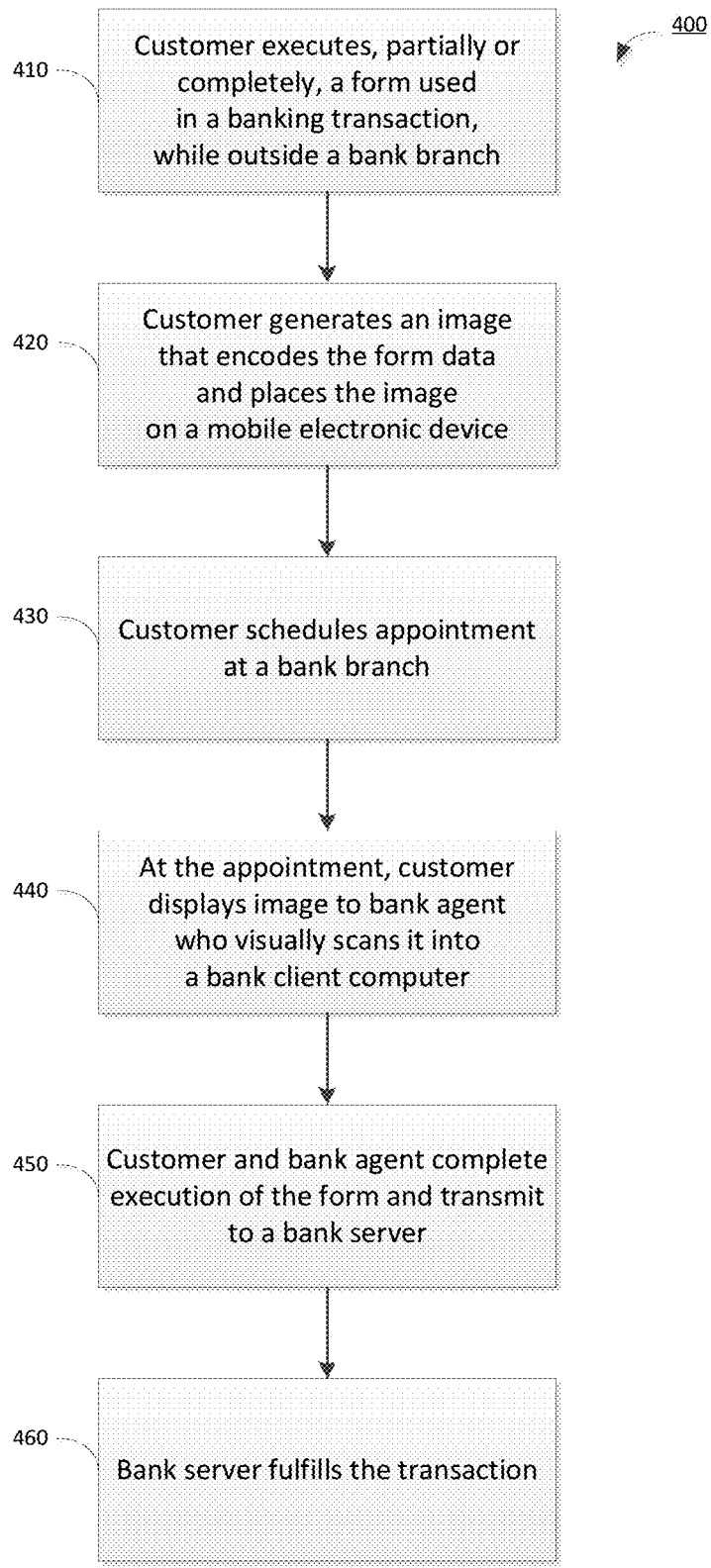
FIG. 4 is a flowchart showing a method of completing a mixed banking transaction in which a customer initiates the transaction outside of a bank branch and completes the transaction inside the bank branch.

FIG. 4 is a flowchart showing a method 400 of completing a mixed banking transaction in which a customer initiates the transaction outside of a bank branch and completes the transaction inside the bank branch. In process 410, the customer executes, partially or completely, a form used in a banking transaction, while the customer is outside a bank branch. The customer might need to first download the form from a bank website, or install an application on his home computer or smartphone. The form thus is made available to the customer by these or other ways known in the art (e.g., receiving a disk). To provide for maximum convenience to the customer, the customer may fill out the form while at home, or at a public kiosk or other convenient location. FIG. 9 shows an example screen in a customer mobile device for filling out a bank form.

In process 420, the customer generates an image that encodes the form data, and places the image on a mobile electronic device. The image may include, for example, a two dimensional barcode such as a QR code. Generation of such images may be done conventionally. FIG. 10 shows an example screen in a customer mobile device for displaying form data as an image. The image may be generated on the mobile device itself, or it may be generated on another computer and transferred to the mobile device. For example, the device may be generated on the customer's desktop computer and transferred via a USB cable, or it may be generated at a public kiosk and transferred via Bluetooth or other near-field communication (NFC) means. It should be appreciated that the invention is not limited to the example communications methods here.

In process 430, the customer schedules an appointment at a bank branch, for the purpose of completing the mixed banking transaction. Such an appointment may be made using the same application earlier installed on the customer's computer or kiosk. The application transmits the customer's location to a bank server, which responds by sending back to the customer a list of nearby bank branches and respective wait times as described below in connection with FIG. 6. FIG. 8 shows an example screen in a customer mobile device for displaying queuing data pertaining to bank branches in a vicinity of the device. Once the customer chooses a bank branch at which to complete the mixed banking transaction, his device communicates this information to the bank server, which processes it as described below in connection with FIG. 6.

Figure 14:
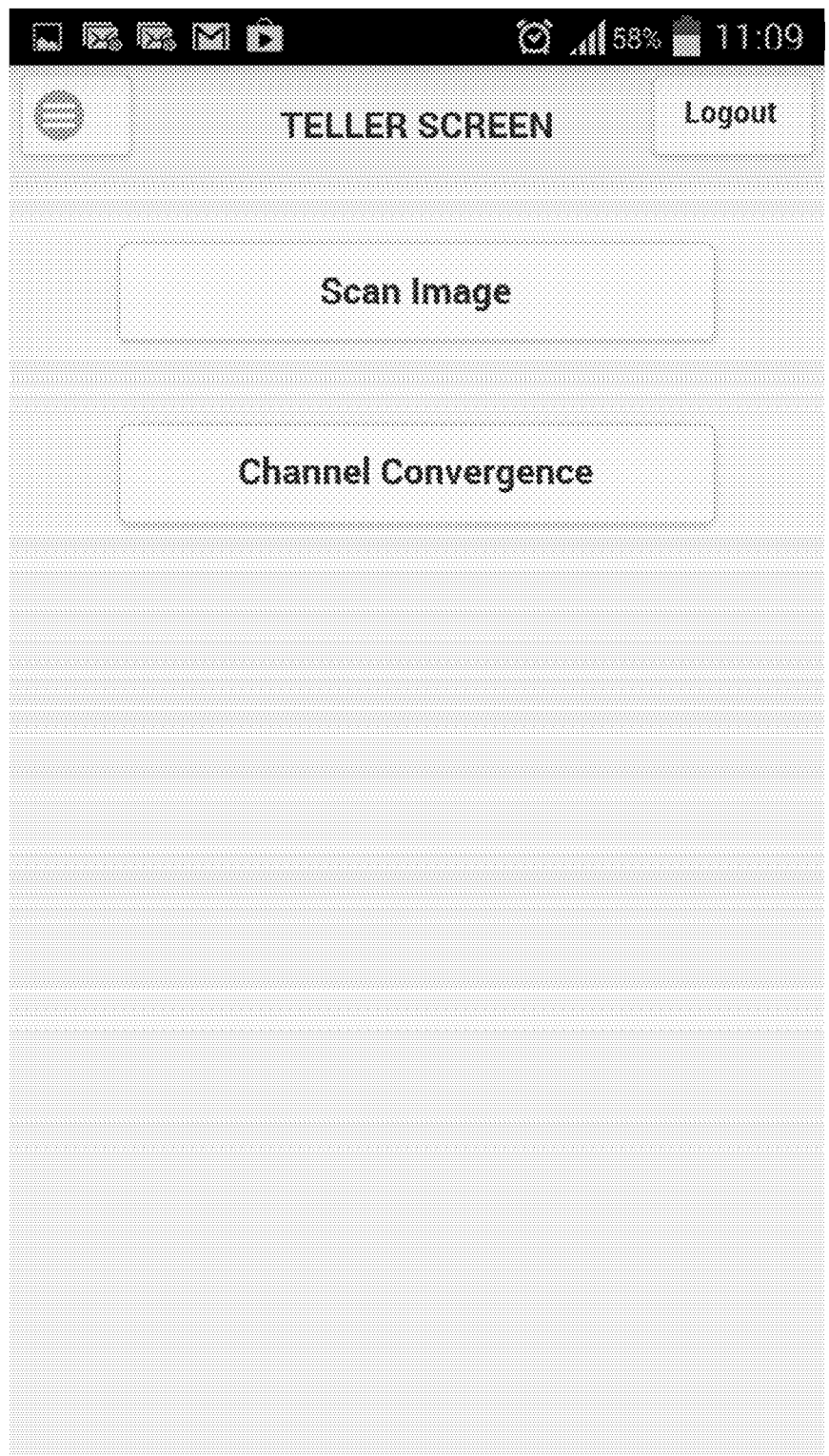
FIG. 14 shows an example screen in a bank client computer for performing administrative tasks.
Figure 15:
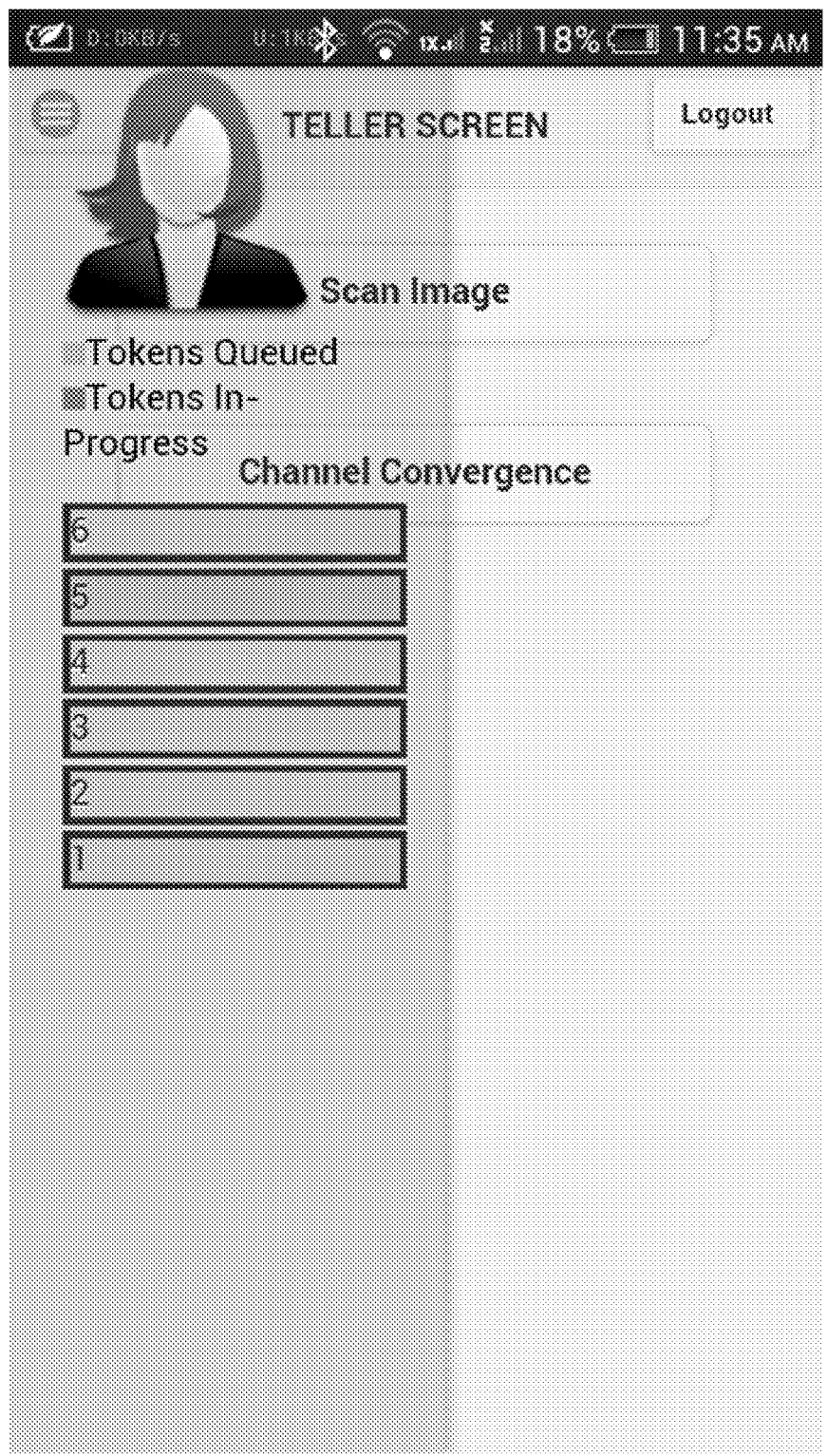
FIG. 15 shows an example screen in a bank client computer for managing customer queuing data.

In process 440, the customer appears at the scheduled appointment, and displays the image generated in process 420 to a bank agent. FIGS. 14 and 15 show administrative screens used by the bank agent to verify that the customer is being served in the proper order; FIG. 15 in particular corresponds to the bank agent's view of the queue shown in FIG. 8. The bank agent visually scans the image into a bank client computer, as described below in connection with FIG. 7. The scanned image is converted back into form data, and displayed on the bank client computer to the agent (and perhaps also to the customer). FIGS. 12 and 13 show example screens in a bank client computer containing different portions of the pre-populated form. Based on the type of transaction (which may be communicated to the bank ahead of time—see FIGS. 6 and 7 below), the bank client computer can determine which product(s) or service(s) the customer wishes to purchase and launch an appropriate product application 144.

Next, in process 450, the customer and the bank agent cooperate to complete execution of the form within the product application 144, and transmit it to a bank server. Finally, in process 460, the bank server fulfills the transaction. It should be understood that some of the processes of the illustrated method may be taken out of order. For example, the customer may schedule and attend the appointment before generating the image that encodes the form data. Persons skilled in the art may envision other variations within the scope of the invention.

Figure 5:
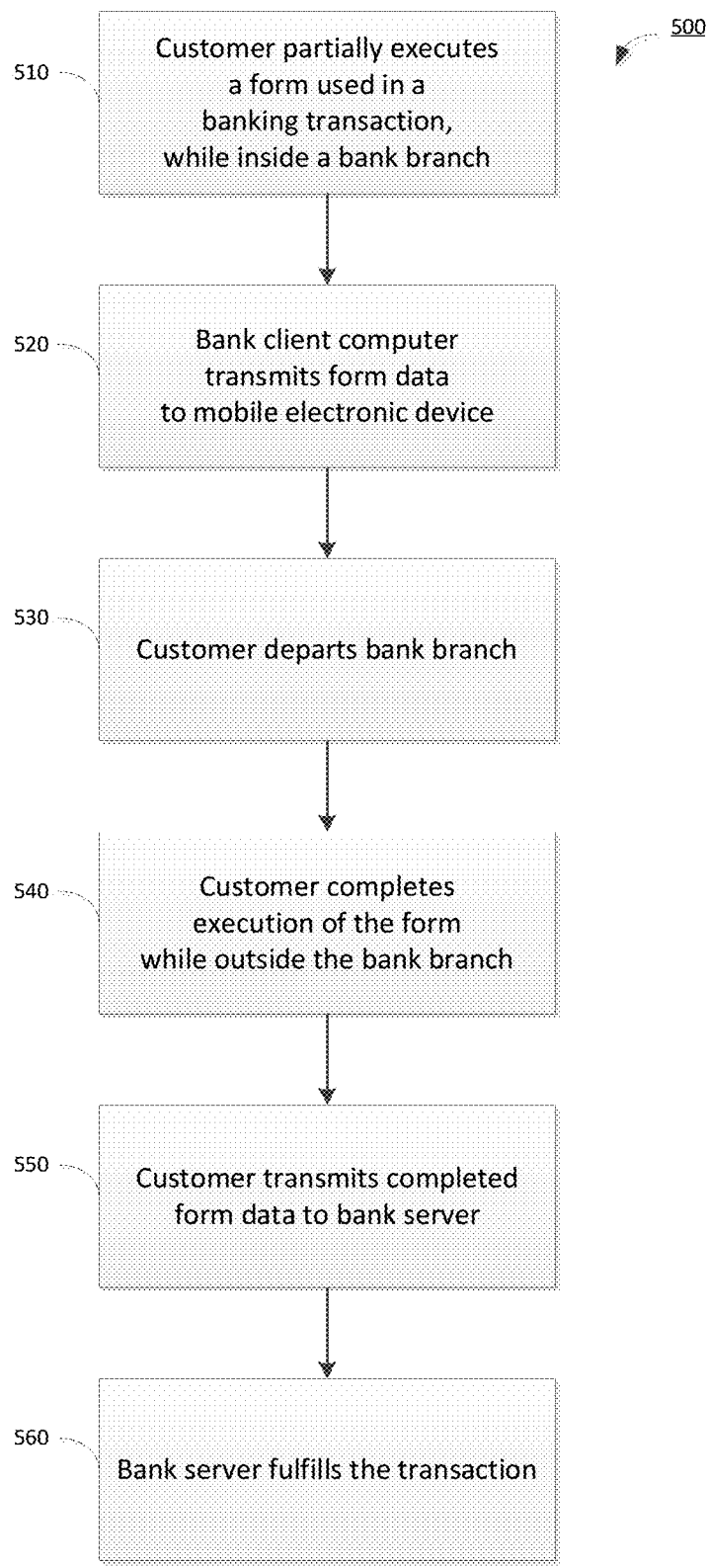
FIG. 5 is a flowchart showing a method of completing a mixed banking transaction in which a customer initiates the transaction inside a bank branch and completes the transaction outside the bank branch.

FIG. 5 is a flowchart showing a method 500 of completing a mixed banking transaction in which a customer initiates the transaction inside a bank branch and completes the transaction outside the bank branch. The processes of the "reverse" transaction of FIG. 5 are similar to that of FIG. 4. Thus, in process 510, the customer partially executes a form used in the banking transaction. However, unlike process 410, in this case the customer is already inside a bank branch. The customer may only be able to partially complete the form, for example, due to having a lack of time to complete the process.

In process 520, the bank client computer transmits the incomplete form data to the customer's mobile electronic device. Any wired or wireless communications medium may be used. The customer is then free to depart the bank branch. At this point, the customer may continue as in FIG. 4, step 420, generating a bar code and returning to the bank branch (or another bank branch) at a later time. However, in accordance with the embodiment of FIG. 5, if the customer and the bank agent have filled in portions of the form that can only be executed at a bank branch, the customer can complete the process from home or from some other convenient location.

Therefore, in process 530, the customer departs the bank branch and travels to a convenient location. In process 540, the customer completes execution of the form while outside the bank branch. In process 550, the customer transmits the completed form data securely to a bank server. Because the customer communicates with the bank server over a public data network such as the Internet, conventional security means such as encryption may be required to perform this process. Finally, in process 560, the bank server fulfills the transaction on behalf of the bank.

Figure 6:
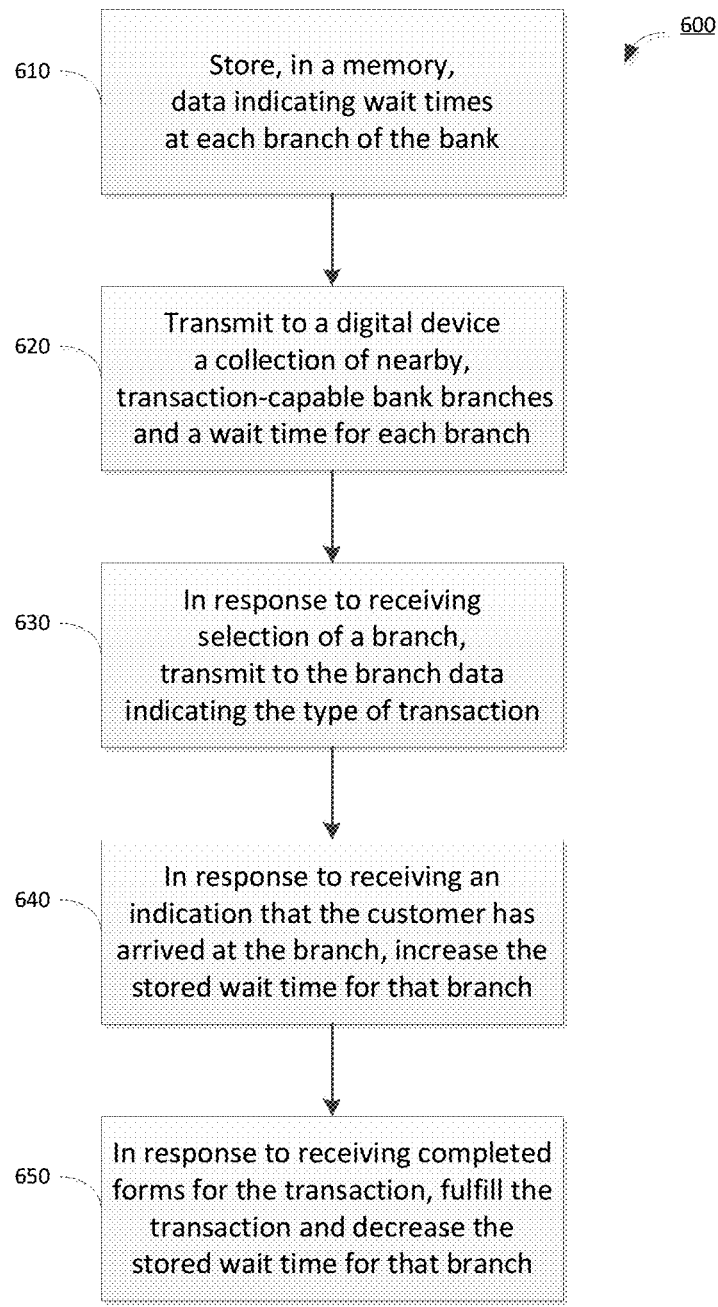
FIG. 6 is a flowchart showing a bank server process for performing a mixed banking transaction pertaining to a given product or service requested by a customer.

FIG. 6 is a flowchart showing a bank server process 600 for performing a mixed banking transaction pertaining to a given product or service requested by a customer. In process 610, the bank server stores, in a memory, data indicating wait times at each of a plurality of branches of the bank. The bank server maintains these data throughout the process 600. The memory may be, for example, a relational database management system (RDBMS) as is known in the art.

In process 620, the bank server (and more particularly, the geotracking engine 136) transmits, to a computer based on the location of the computer and a transaction type received from the computer when the computer is not physically present at a bank branch, (a) a collection of bank branches in physical proximity to the computer that are capable of servicing the transaction, and (b) a wait time for each branch in the collection. The location data pertain to a location of the computer, which may be any of the digital devices 110.

The geotracking engine 136 may receive requests from both mobile and stationary computers. Therefore, a location cache may be used to determine the nearby bank branches. In such an embodiment, the bank server may receive data indicating whether the computer is mobile, and thereby a simple binary test can determine whether to access the cache. Once the nearby bank branches have been determined, the wait times are retrieved from the memory.

Next, the customer operating the digital device selects one of the bank branches in the collection. The decision may be made based on the convenience of traveling to the branch, the wait time of the branch, the hours of operation of the branch, or any other factor. In process 630, the bank server receives the selection, and transmits, to a bank client computer physically located within a given bank branch, data indicating the type of transaction to permit the bank branch to prepare for the arrival of the customer. This transmission constitutes the making of an appointment, by the customer, to transact business at the given bank branch at a time in the near future; that is, as soon as the customer can travel to the branch or at some other prearranged time.

At some point the customer will reach the branch and begin the appointment. During that process, the bank client computer will authenticate the customer. In process 640, the bank server receives, from the bank client computer, data indicating that the customer has arrived at the given bank branch, and alters the data stored in the memory to increase the wait time for the given bank branch as a function of the type of the transaction. The wait time must be increased because the bank server has received confirmation that the customer is currently in the bank branch transacting business, and therefore the wait time for new business at that branch has risen.

The amount of the increase in wait time is based on the type of transaction. For example, originating a home mortgage loan takes a different amount of time than cashing a check or opening an account. The amount of the increase may thus be determined empirically, for example by conducting, at each bank branch, a study on how long each transaction type takes to perform. Reductions in the wait time increase may be computed as a function of how much work has already been done by the customer prior to arriving at the bank branch. Thus, a customer who has filled out almost all of her forms prior to arriving at the bank branch will increase the wait time less than a customer who has not filled out any forms prior to his arrival.

Eventually, the customer will finish executing all necessary forms, and the bank client computer will transmit them to the bank server. On receipt of these forms, in process 650, the bank server will fulfill the transaction on behalf of the bank and alter the data stored in the memory to decrease the wait time for the given bank branch.

Figure 7:
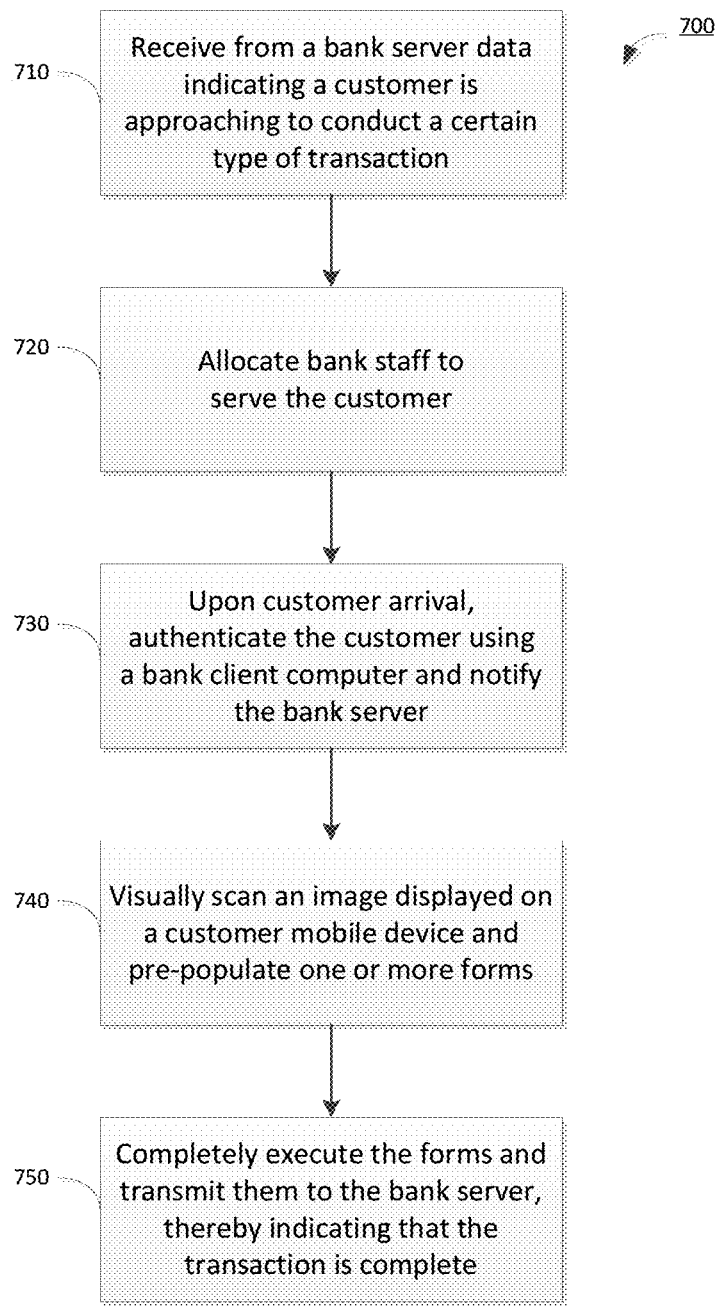
FIG. 7 is a flowchart showing a bank branch process for performing the transaction of FIG. 6.

FIG. 7 is a flowchart showing a bank branch process 700 for performing the transaction of FIG. 6. In process 710, a bank client computer receives, from a bank server, data indicating that a customer is approaching to conduct a certain type of transaction. This process 710 is the counterpart to process 630. In process 720, the bank branch allocates staff to serve the customer on the basis of the indication. This process ensures that when the customer arrives, adequate staff will be on hand and prepared to assist the customer.

In process 730, upon customer arrival, a member of the bank staff authenticates the customer using a bank client computer, after which the bank client computer notifies the bank server that the customer has arrived. FIG. 11 shows an example screen in a bank client computer for choosing a method by which to authenticate a customer. Authentication may be entirely conventional. Process 730 is the counterpart to process 640.

In process 740, the staff member visually scans an image displayed on a customer mobile device, and the bank client computer uses data encoded in the scanned image to prepopulate one or more banking forms related to the type of transaction. FIGS. 12 and 13 show such a form on the bank client computer. Finally, in process 750, the staff member assists the customer to completely execute the forms, and then instructs the bank client computer to transmit them to the bank server. This transmission indicates to the bank server computer that the transaction is finished and the wait time data should be decreased. Process 750 is the counterpart to process 650.

In addition to the above functionality, various embodiments of the invention provide a game for the customer to play to achieve a life goal by managing the customer's personal finances. Customers may wish to take a trip to various locations and experience distant cultures, save for retirement, put aside money to gamble, donate to charity, or participate with others doing the same things. However, not all bank customers can afford to simply pay for these life goals; instead, they must juggle their finances to make them happen.

Referring again to FIG. 1, one of the functions 120 that the bank may provide is personal finance management 122. The bank server 130 may include an analytics engine 132 that maintains information about the customer's financial health to implement this function. For example, the analytics engine 132 may track the customer's bank account balances, investments (such as CDs and stocks), and income, as well as her spending patterns with regard to utility bills, educational expenses, shopping, and so on. The engine 132 uses this information to determine the user's income and expense patterns, and develop suggestions for how the user might save more, or spend less.

The bank server 130 also includes a gamification engine 134. To provide financial advice in a user friendly manner, the gamification engine 134 takes data about the customer's life goals and current financial situation, and converts these data into a game that the customer can play. The gamification engine 134 interacts with the customer's digital devices 110 to provide the game as part of the personal financial management function 122.

Figure 16:
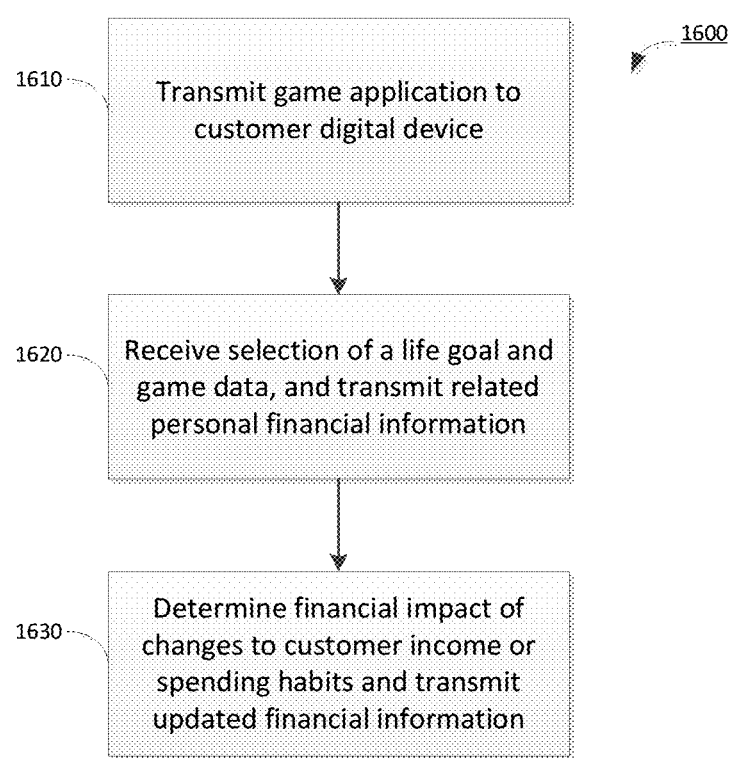
FIG. 16 is a flowchart showing a bank server process 1800 for providing a game to a digital device.

FIG. 16 is a flowchart showing a bank server process 1600 for providing a game to a digital device. In process 1610, the bank server transmits an application to a customer digital device. This process 1610 typically occurs when the customer requests that personal financial management software be installed on the device.

Figure 17:
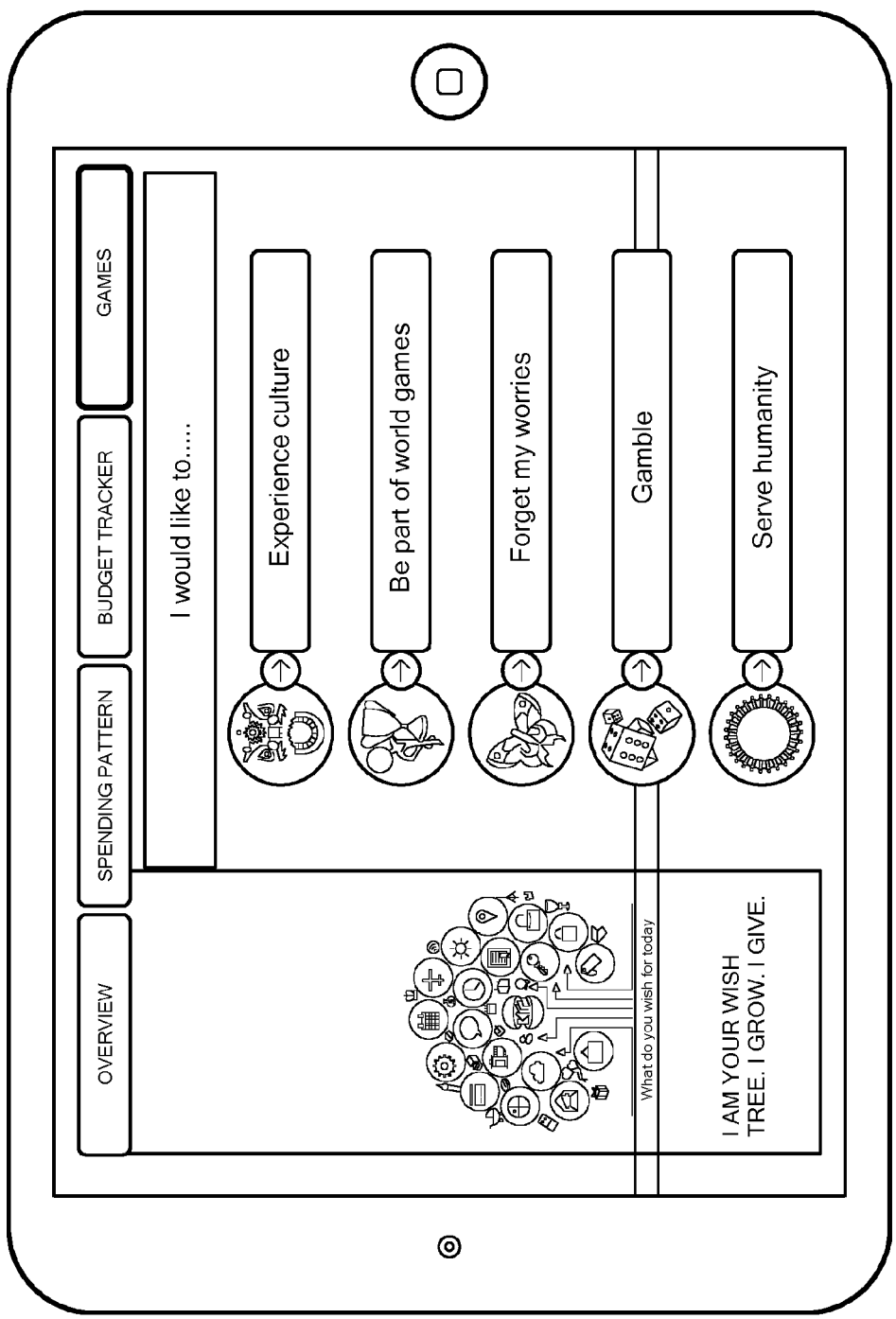
FIG. 17 shows an example game screen in a customer mobile device for selecting a type of life goal.
Figure 18:
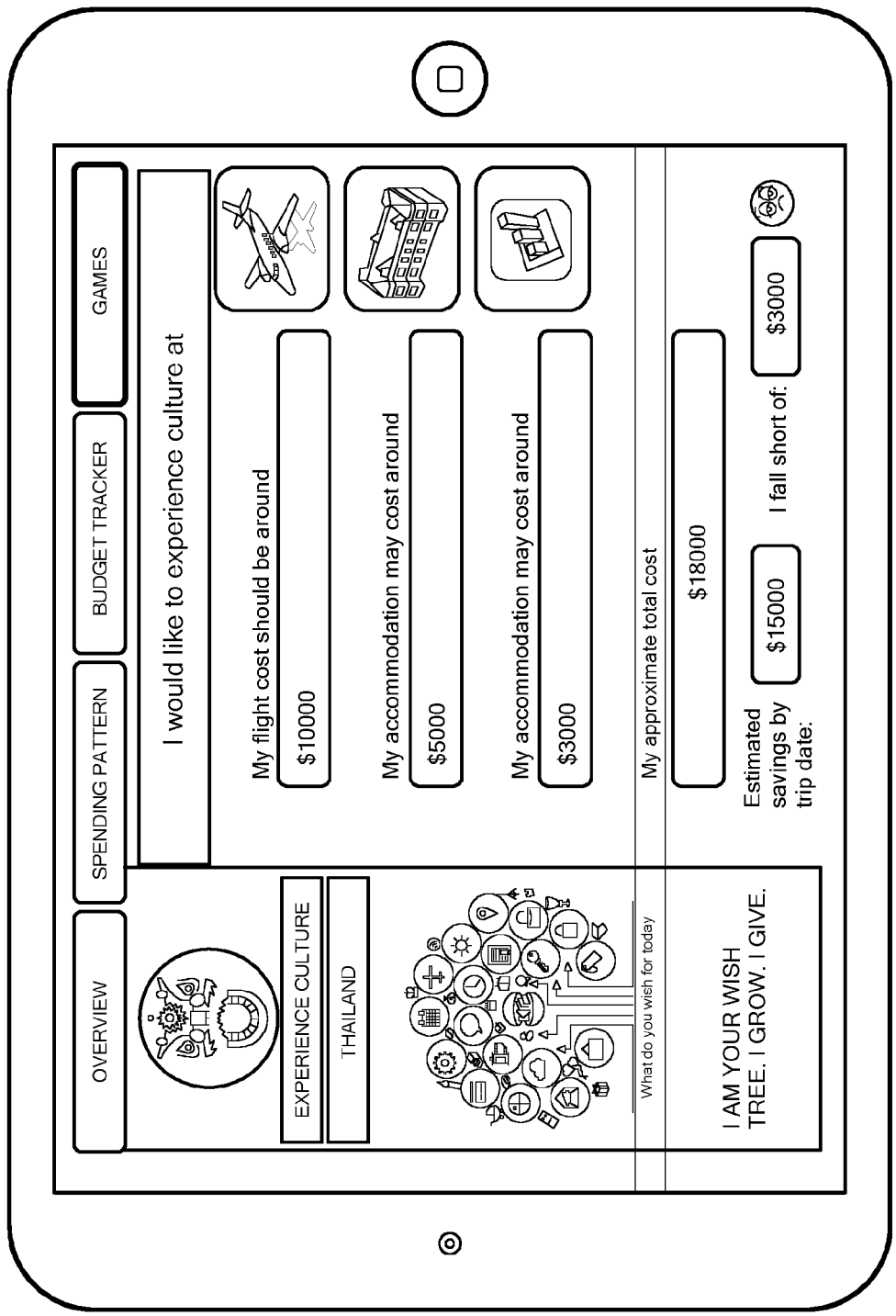
FIG. 18 shows an example game screen in a customer mobile device for setting parameters of the life goal of FIG. 17.

Next, the customer launches the application. When the game begins, the customer is asked to choose a particular life goal to pursue. FIG. 17 shows an example game screen in a customer mobile device for selecting a type of life goal. The customer selects a life goal, for example "Experience Culture". The game then displays a screen that prompts the user for information about their trip, including a date and various costs involved. FIG. 18 shows an example game screen in a customer mobile device for setting parameters of the life goal of FIG. 17.

In process 1620, the bank server receives the selection of the life goal and these game data, and transmits, to the customer digital device, related customer personal financial data. In the case of a trip to Thailand, the related data may include projected savings by the planned trip date, based on the customer's current income and expense patterns. The application then displays this information to provide the customer with an indication of the status of the game; that is, the progress of the customer toward his financial goals.

Figure 19:
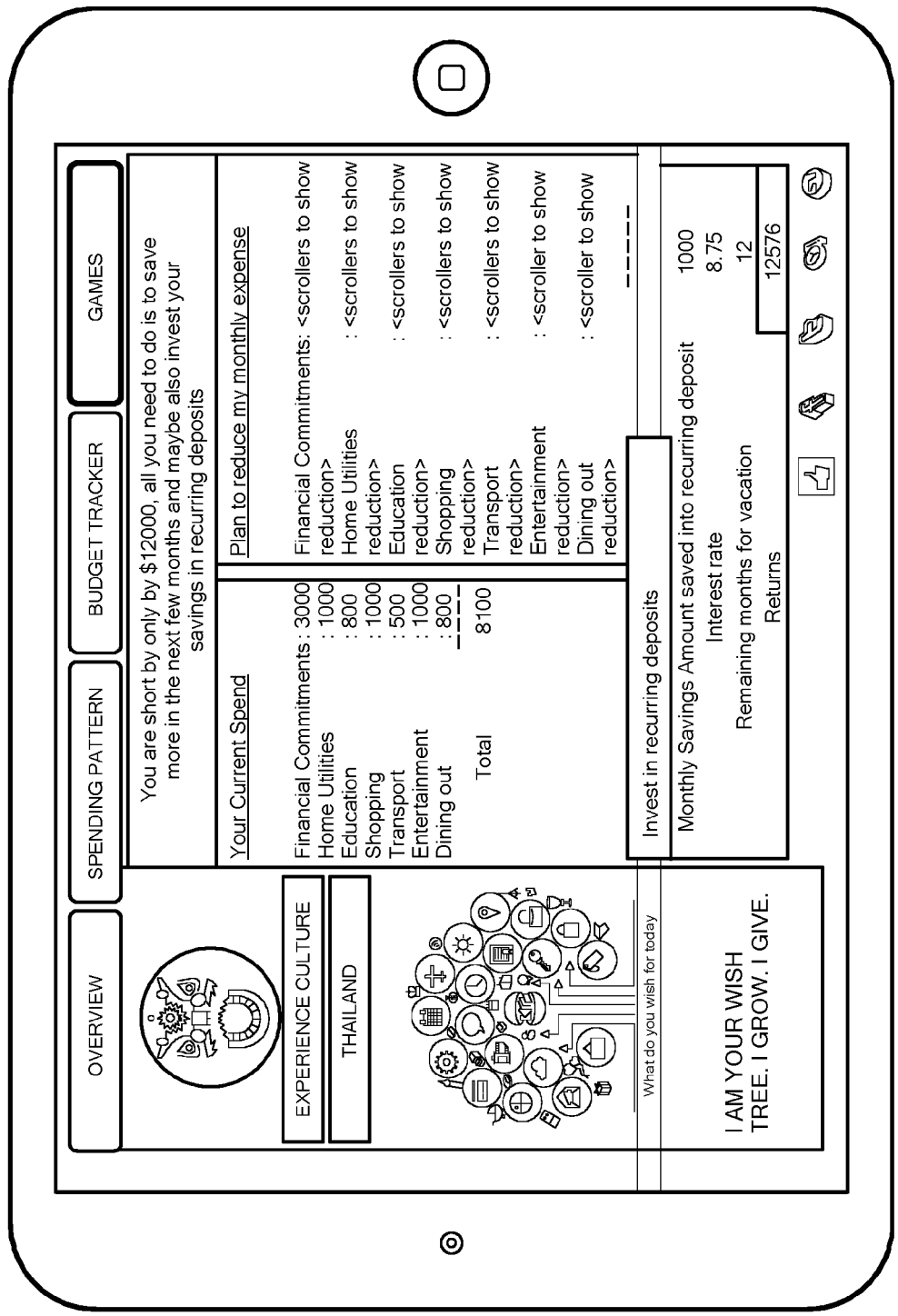
FIG. 19 shows an example game screen in a customer mobile device for structuring the customer's finances to achieve the selected life goal of FIG. 17.

If the customer is falling short of achieving his goal, the game may then display a screen showing the customer's spending habits and one or more recommendations for changes that can improve the customer's position. FIG. 19 shows an example game screen in a customer mobile device for structuring the customer's finances to achieve the selected life goal of FIG. 17. In particular, the analytics engine 132 may determine that the customer's spending habits on shopping exceed those of an average customer profile, and provide this information to the gamification engine 134 for transmission to the digital device in a suggestion box.

Next, the game may take input from the customer to help the customer devise a plan alter his spending habits. The game may show a series of options to help reduce utility bills, transportation expenses, meal expenses, and so on. Any selections are transmitted to the bank server. In process 1630, the analytics engine determines the financial impact of the changes on the customer's finances and transmits updated personal financial data to the digital device. The updated data permit the game to display a new level of customer progress toward his chosen goals. The customer can "win" the game when his projected financial situation aligns with his chosen goal parameters.

Figure 20:
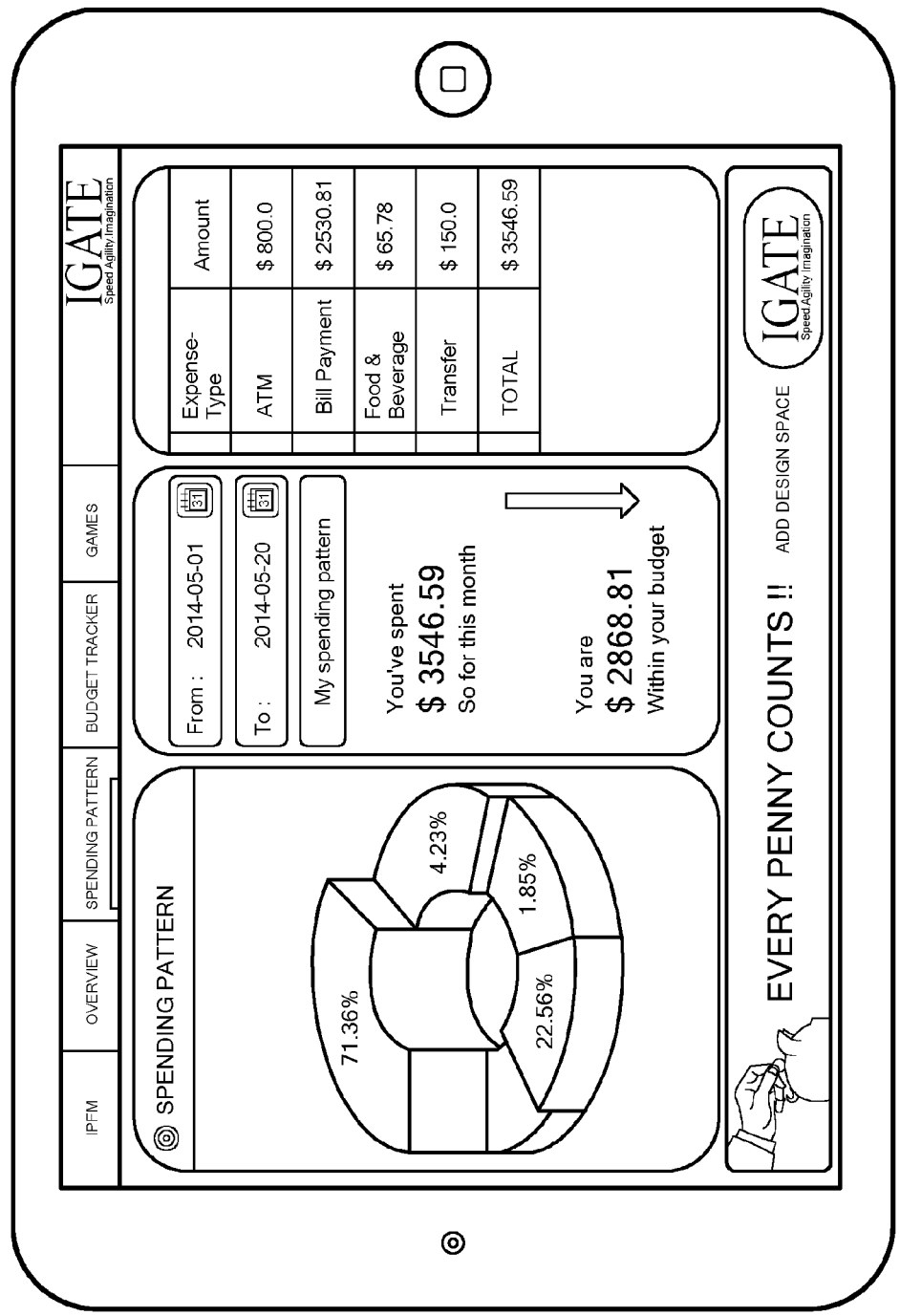
FIG. 20 shows an example game screen in a customer mobile device that displays an advertisement for a banking product or service that will help the customer manage the customer's finances.

In one embodiment, the bank helps the customer devise his financial plan by providing targeted advertisements. The analytics engine 132 may determine that a particular product or service offered by the bank, if purchased by the customer, will help the customer achieve his goal. In this embodiment, the analytics engine 132 provides this suggestion to the gamification engine 134, which electronically transmits, to the customer's digital device, an associated advertisement for the given product or service for display in the context of the interactive game. FIG. 20 shows an example game screen in a customer mobile device that displays an advertisement for a banking product or service that will help the customer manage the customer's finances. By providing such targeted advertisements, the game helps the customer to efficiently achieve his personal financial goals.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible, non-transitory medium, such as a computer readable medium (e.g., a diskette, CD-ROM, ROM, or fixed disk). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). In fact, some embodiments may be implemented in a software-as-a-service model ("SAAS") or cloud computing model. Of course, some embodiments of the invention may be implemented as a combination of both software (e.g., a computer program product) and hardware. Still other embodiments of the invention are implemented as entirely hardware, or entirely software.

The embodiments of the invention described above are intended to be merely exemplary; numerous variations and modifications will be apparent to those skilled in the art. All such variations and modifications are intended to be within the scope of the present invention as defined in any appended claims.

What is claimed is:

1. A method of fulfilling a transaction between a bank and a customer of the bank, the method comprising:
    storing wait data in a memory, the wait data indicating wait times at each of a plurality of branches of the bank;
    transmitting, to a digital device based on the location of the digital device and a type of the transaction received from the digital device when the digital device is not physically present at a bank branch, (a) at least one bank branch within a specified physical proximity to the digital device that is capable of servicing transactions having the received type, and (b) a wait time for each of the at least one bank branch;
    in response to receiving, from the digital device, a selection of a given bank branch in the at least one bank branch, transmitting, to a bank client computer physically located within the given bank branch, data indicating the type of the transaction;
    in response to receiving, from the bank client computer, arrival data indicating that the customer has arrived at the given bank branch, altering the wait data stored in the memory to increase the wait time for the given bank branch as a function of the type of the transaction; and
    in response to receiving data pertaining to the transaction from the bank client computer, (a) fulfilling the transaction on behalf of the bank and (b) altering the wait data stored in the memory to decrease the wait time for the given bank branch, at least a portion of the data pertaining to the transaction being received in the bank client computer by scanning an encoded visual display of a customer mobile device.

2. A method according to claim 1, wherein the transaction comprises one of:
    opening or closing a bank account, cashing a check, activating or deactivating a banking service, applying for a loan, applying for a line of credit, depositing valuables for safekeeping, investing in an interest-bearing asset, or managing wealth.

3. A method according to claim 1, wherein the customer mobile device comprises a telephone, a laptop computer, a tablet computer, a smartphone, or a personal digital assistant.

4. A method according to claim 1, wherein the digital device comprises a telephone, a laptop computer, a tablet computer, a personal digital assistant, a smartphone, a desktop computer, or a kiosk computer.

5. A method according to claim 1, wherein the scanned portion of the transaction data is entered into the customer mobile device when the customer is not physically within the given bank branch.

6. A method according to claim 1, wherein the visual display includes an image of a two dimensional barcode that encodes the transaction data.

7. A method according to claim 1, further comprising producing, and electronically transmitting to the customer mobile device, an interactive game for reaching a goal related to the customer's personal finances.

8. A method according to claim 7, further comprising:
    selecting a banking product that, if purchased by the customer, is directed to help the customer achieve the goal related to the customer's personal finances; and
    electronically transmitting to the customer mobile device, for display in the context of the interactive game, an advertisement for the selected banking product or service.

9. A computer program product for use on a computer system for fulfilling a transaction between a bank and a customer of the bank, the computer program product comprising a tangible, non-transient computer usable medium having computer readable program code thereon, the computer readable program code comprising:
    first program code for storing wait data in a memory, the wait data indicating wait times at each of a plurality of branches of the bank;
    second program code for transmitting, to a digital device based on the location of the digital device and a type of the transaction received from the digital device when the digital device is not physically present at a bank branch, (a) at least one bank branch within a specified physical proximity to the digital device that is capable of servicing transactions having the received type, and (b) a wait time for each of the at least one bank branch;
    third program code for transmitting, to a bank client computer physically located within the given bank branch, data indicating the type of transaction, the third program code being responsive to receiving, from the digital device, a selection of a given bank branch in the at least one bank branch;
    fourth program code for altering the wait data stored in the memory to increase the wait time for the given bank branch as a function of the type of the transaction, the fourth program code being responsive to receiving, from the bank client computer, arrival data indicating that the customer has arrived at the given bank branch;
    fifth program code for fulfilling the transaction on behalf of the bank; and
    sixth program code for altering the wait data stored in the memory to decrease the wait time for the given bank branch,
    the fifth program code and the sixth program code being responsive to receiving data pertaining to the transaction from the bank client computer, at least a portion of the data pertaining to the transaction being received in the bank client computer by scanning an encoded visual display of a customer mobile device.

10. A computer program product according to claim 9, wherein the customer mobile device comprises a telephone, a laptop computer, a tablet computer, a smartphone, or a personal digital assistant.

11. A computer program product according to claim 9, wherein the scanned portion of the transaction data is entered into the customer mobile device when the customer is not physically within the given bank branch.

12. A computer program product according to claim 9, wherein the visual display includes an image of a two dimensional barcode that encodes the transaction data.

* * * * *